(12) United States Patent
Saeed et al.

(10) Patent No.: US 8,043,499 B2
(45) Date of Patent: Oct. 25, 2011

(54) PORTABLE AND AUTONOMOUS DESALINATION SYSTEM

(75) Inventors: Farooq Saeed, Dhahran (SA); Ahmed Z. Al-Garni, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 449 days.

(21) Appl. No.: 12/289,522

(22) Filed: Oct. 29, 2008

(65) Prior Publication Data

US 2010/0101988 A1 Apr. 29, 2010

(51) Int. Cl.
    *C02F 1/00* (2006.01)
    *C02F 1/44* (2006.01)
    *F03D 9/00* (2006.01)
(52) U.S. Cl. .................. 210/171; 290/55; 210/321.6
(58) Field of Classification Search .................. 210/171, 210/170.11; 136/244; 290/55
See application file for complete search history.

(56) References Cited

U.S. PATENT DOCUMENTS

| | | | |
|---|---|---|---|
| 5,004,535 A | 4/1991 | Bosko et al. | |
| 5,507,943 A | 4/1996 | Labrador | |
| 5,582,690 A | 12/1996 | Weinberger et al. | |
| 5,645,693 A | 7/1997 | Gode | |
| 6,165,326 A | 12/2000 | Markopulos | |
| 6,464,884 B1 * | 10/2002 | Gadgil | 210/748.11 |
| 6,647,717 B2 | 11/2003 | Zaslavsky et al. | |
| 6,804,962 B1 | 10/2004 | Prueitt | |
| 7,775,374 B1 * | 8/2010 | Barker et al. | 210/416.3 |
| 2002/0020010 A1 | 2/2002 | Mizutani | |
| 2003/0228195 A1 | 12/2003 | Mizutani | |
| 2006/0188364 A1 * | 8/2006 | Fritz | 415/4.2 |
| 2007/0245730 A1 | 10/2007 | Mok | |
| 2008/0217925 A1 * | 9/2008 | Boone et al. | 290/55 |
| 2009/0072544 A1 * | 3/2009 | Pao | 290/55 |

FOREIGN PATENT DOCUMENTS

| | | |
|---|---|---|
| CN | 1865164 | 11/2006 |
| DE | 19936702 | 2/2001 |
| DE | 102005003754 | 8/2006 |
| ES | 52165824 | 3/2002 |

* cited by examiner

*Primary Examiner* — Kevin Joyner
(74) *Attorney, Agent, or Firm* — Richard C. Litman

(57) ABSTRACT

The portable and autonomous desalination system is an autonomous reverse osmosis (RO) desalination system utilizing power from a combination of electricity generation and storage sources that include a photovoltaic (PV) unit, a vertical-axis wind turbine (VAWT) unit, and an electricity storage unit. Electric power from PV, VAWT or storage units or a combination of these units is provided, depending upon the availability of sunlight or wind, or for night operation for water desalination using the reverse-osmosis process. The unit is portable, environmentally friendly, self-sufficient and self-sustaining in terms of supplying the electricity and fresh drinking water needs of the typical household. Multiple PV-VAWT-RO desalination units are combined together to provide fresh, clean water and electricity for communities of various sizes. A small-size, straight-bladed vertical axis wind turbine runs at very low wind speeds for urban operation.

8 Claims, 5 Drawing Sheets

US 8,043,499 B2

PORTABLE AND AUTONOMOUS DESALINATION SYSTEM

BACKGROUND OF THE INVENTION

1. Field of the Invention

The present invention relates to desalination units, and more specifically to using photovoltaic cells and wind electric power generators to power a reverse osmosis desalination unit.

2. Description of the Related Art

Although the use of wind energy for electricity, solar energy for distillation or desalination, or a combination thereof has been attempted in the related art, the use of the present combination of wind using a vertical-axis wind turbine, solar energy using photovoltaic cells and a desalination unit based on reverse osmosis process to provide portability, and increased efficiency and effectiveness is believed to be non existent in the literature.

Thus, a portable and autonomous desalination system solving the aforementioned problems is desired.

SUMMARY OF THE INVENTION

The portable and autonomous desalination system is an autonomous reverse-osmosis (RO) based desalination system utilizing power from a combination of electricity generation and storage sources that include a photovoltaic (PV) unit, a vertical axis wind turbine (VAWT) unit, and an electricity storage unit.

Electric power from PV, VAWT, storage units, or a combination of these units is provided, depending upon the availability of sunlight and wind, for night operation for water desalination using the reverse-osmosis process. The unit is portable, environmentally friendly, self-sufficient and self-sustaining, while supplying the electricity and fresh drinking water needs of the typical household.

Multiple PV-VAWT-RO desalination units may be combined together to provide fresh, clean water and electricity for communities of various sizes. A small-sized straight-bladed vertical axis wind turbine runs at very low wind speeds for urban operation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
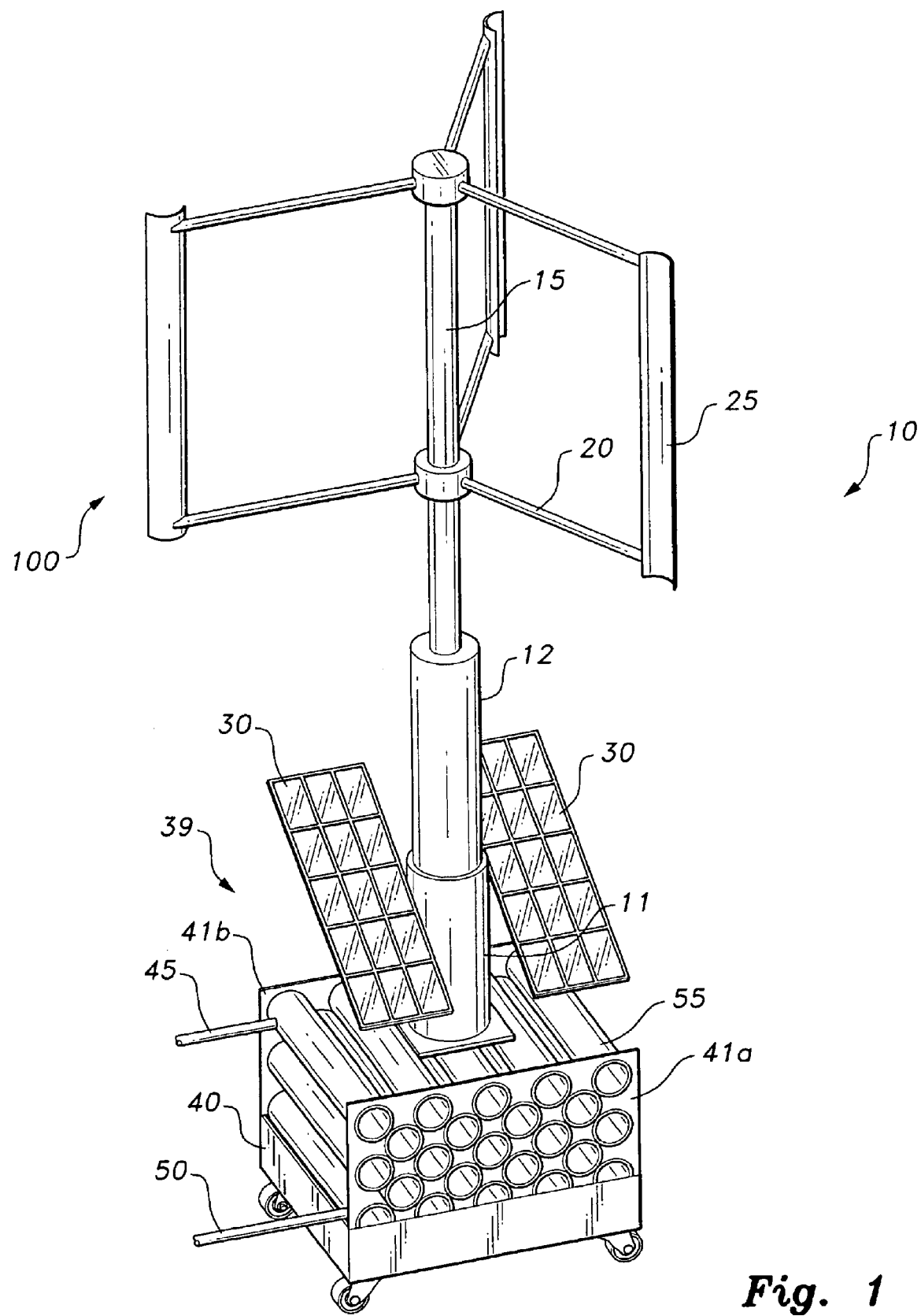
FIG. 1 is a perspective view showing the basic PV-VAWT-RO desalination unit of a portable and autonomous desalination system according to the present invention.
Figure 2:
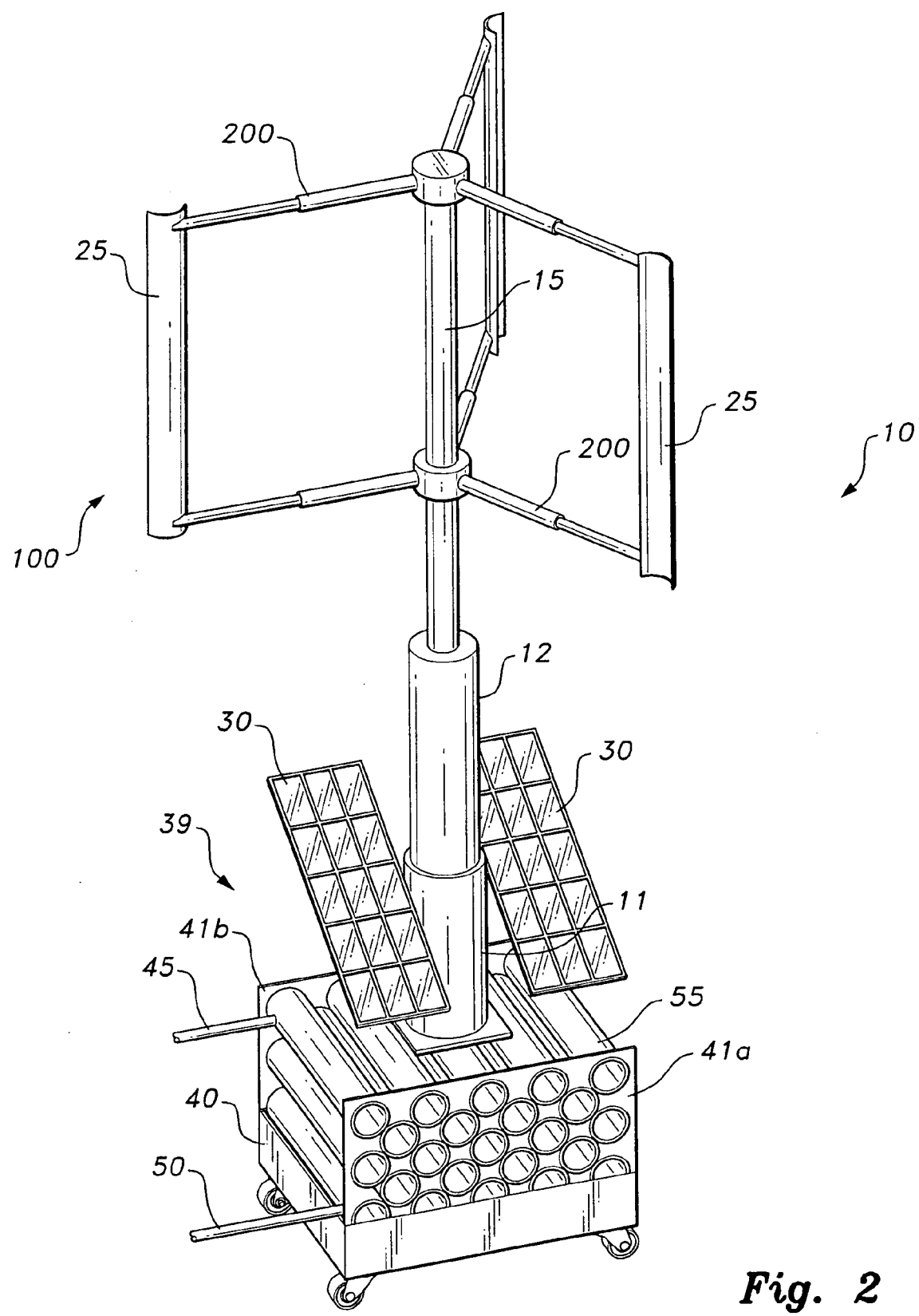
FIG. 2 is a perspective view of a portable and autonomous desalination system according to the present invention, showing telescopic arms to extend or retract the blades and a telescopic hub that can be used to raise or lower the VAWT above any obstacles.
Figure 3:
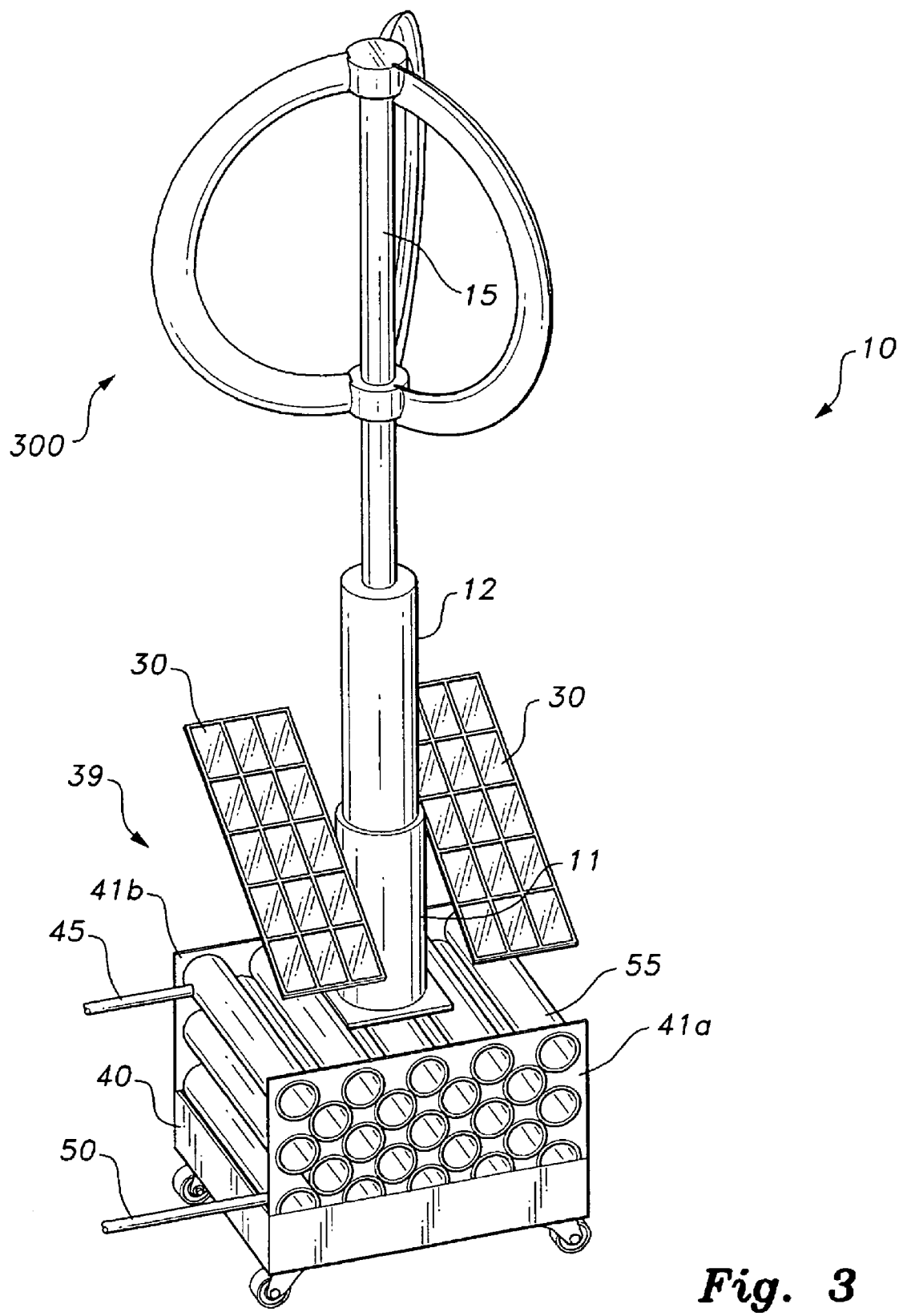
FIG. 3 is a perspective view showing a curved blade VAWT of a portable and autonomous desalination system according to the present invention.

As shown in FIGS. 1-3, the present invention relates to an environmentally friendly, self-sufficient and self-sustaining desalination system 10 that can provide the electricity, fresh drinking water, irrigation, and/or recreational needs of a small community located near a salt water source, e.g., a sea or an ocean. Multiple PV-VAWT-RO desalination units can be combined together to provide fresh, clean water and electricity for communities of various sizes.

As shown in FIG. 1, the system 10 can include a vertical axis wind turbine (VAWT) 100 having blades 25 suspended by frame members 20 that extend from rotating pole 15, multiple arrays of solar panels 30, a reverse-osmosis based desalination unit 39, a permanent magnet-based electricity generator 11, and an electrical storage system comprising batteries, all supported by a portable mounting base 40. Wheels are disposed on the bottom of the base 40 to facilitate portability of the base 40. A vertically disposed telescopic hub 12 can raise or lower the wind turbine 100. As shown in FIG. 2, horizontally disposed telescopic arms 200 may be utilized to extend or retract blades 25. As shown in FIG. 3, the vertical axis wind turbine may incorporate curved blades 300.

The Reverse Osmosis (RO) unit 39 is disposed in a wheeled base 40. Gravity feed inlet 45 permits salt water to enter tubes 55. Desalinated water is removed via water outlet 50, also connected to tubes 55. The tubes 55 are disposed in a stacked manner on portable base 40. The tubes 55 are stabilized on base 40 by a front planar vertical wall 41a and a rear planar vertical wall 41b. The vertical walls 41a and 41b have bores through which the tubes 55 are supported. Detailed operation of the RO unit 39 is known by persons having ordinary skill in the art.

The straight-bladed vertical axis wind turbine (VAWT) 100 is designed to operate at low wind speeds, i.e., cut-in speeds of about 2-3 m/s, enabling the turbine to be utilized for providing fresh water and electricity within the urban environment where wind speeds near the surface can be as low as 2-3 m/s during a significant part of the year. The advantage of using a VAWT, such as VAWT 100, is inherent in the small-scale straight-bladed VAWTs that are now being used in a host of applications within the urban environment, such as traffic signals, road-side advertisements, parking meters, street and park lighting systems, to name a few.

Moreover, other advantages inherent in a straight-bladed VAWT, as compared to the conventional horizontal-axis wind turbine or HAWT, include omni-directional operation capability (a VAWT can operate with wind from any direction, whereas a HAWT needs to be oriented into the wind for maximum output, which may require power and the use of a wind monitoring system) and low cut-in speed capability (similarly rated HAWTs require significant wind speeds (>5 m/s) for start-up to overcome inertia and gravity) and any useful power output). Greater than 5 meter/second wind speeds are typically not available near the ground in an urban environment, and thus HAWTs must be installed on top of high towers so that the HAWT and its blades are above any ground obstructions to the local wind. The need for high towers for HAWTs makes them very unsuitable for the urban environment, as well as very difficult to move.

The small size of VAWT 100 also makes it very portable as compared to a HAWT of similar size. Straight-bladed VAWT 100 is simpler in design, and therefore easier and cheaper to manufacture as compared to a HAWT.

The VAWT system 10 is also simple to maintain because of its straightforward design. Moreover, the electricity generator 11 is preferably located at the base 40 for ease of maintenance, whereas in the case of a HAWT, the generator is usually mounted on top of the tower along with the HAWT unit. This fact alone makes the maintenance of a VAWT very easy and inexpensive when compared to the maintenance of a HAWT.

Thus, the above inherent advantages of small-sized straight-bladed VAWTs, such as VAWT 100, in desalination system 10 are readily apparent when it comes to efficiency, low-cost, low-maintenance, portability, environmental soundness, self-sufficiency, self-sustainability and autonomy.

The power generated by VAWT 100 in system 10 can be used to run small reverse-osmosis desalination unit 39 to provide fresh water to a household. Use of photovoltaic (PV) arrays 30 and electrical storage units can supplement the power in the absence of wind or daylight.

The PV-VAWT-RO system 10 can take advantage of the prevailing winds (utilizing trade winds or land and sea breezes near coastal areas) when it is placed downstream of convergent channels or ducts aligned with the direction of the prevailing winds to further enhance the power output from VAWT 100.

The convergent channel or passage formed by a concrete structure or by a specific arrangement of trees may be utilized to provide an extra boost to the wind speed available to system 10. Knowledge of prevalent wind directions, particularly the trade winds {trade winds blow in different directions in the northern (from northeast) and southern (from south east) hemispheres} and the land/sea breezes near coastal areas can be used to orient the convergent channels parallel to the wind to maximize outputs from the PV-VAWT desalination units 10.

Figure 4A:
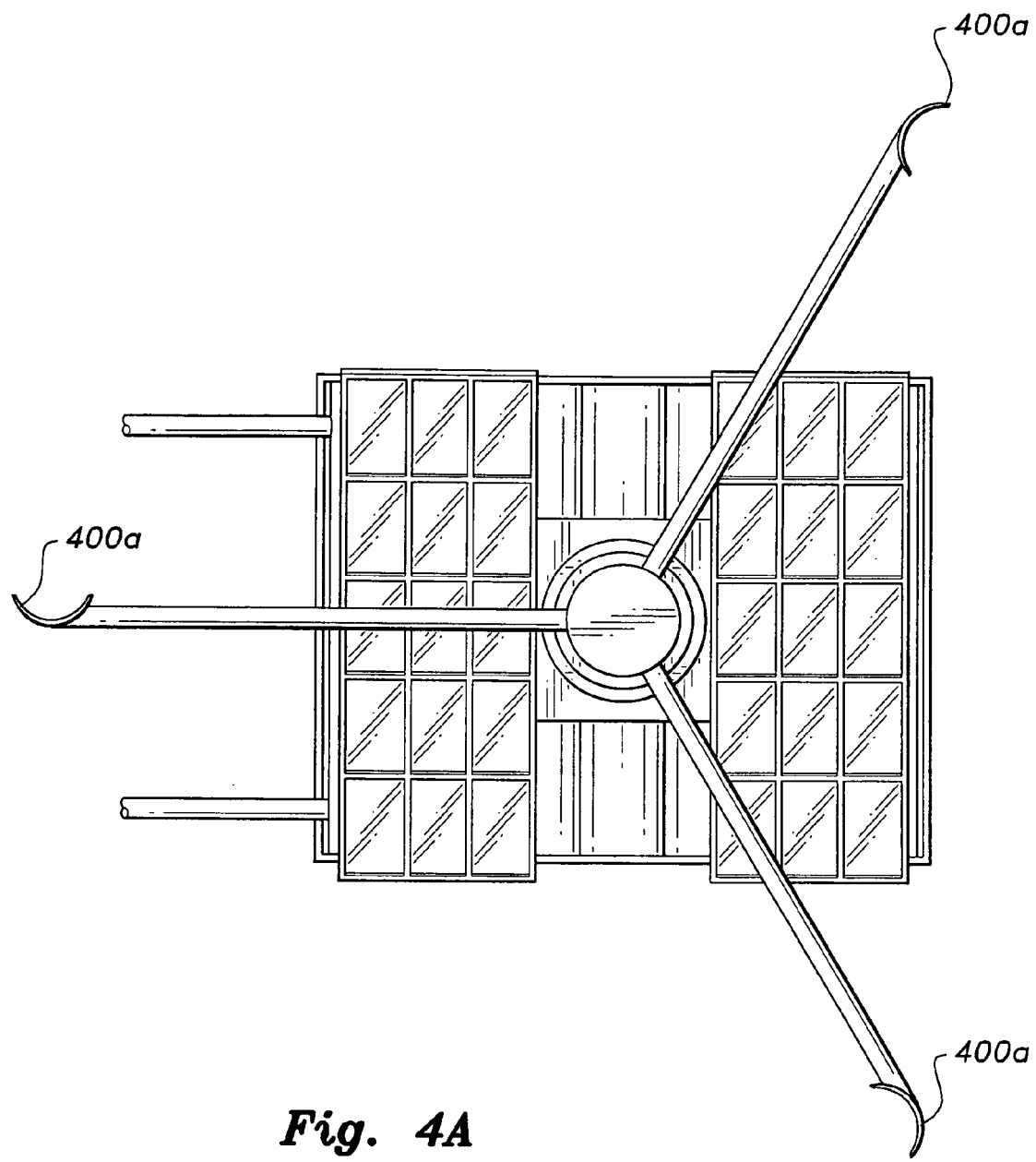
FIG. 4A is a top view of a VAWT of a portable and autonomous desalination system according to the present invention, showing the turbine configured as a drag device.
Figure 4B:
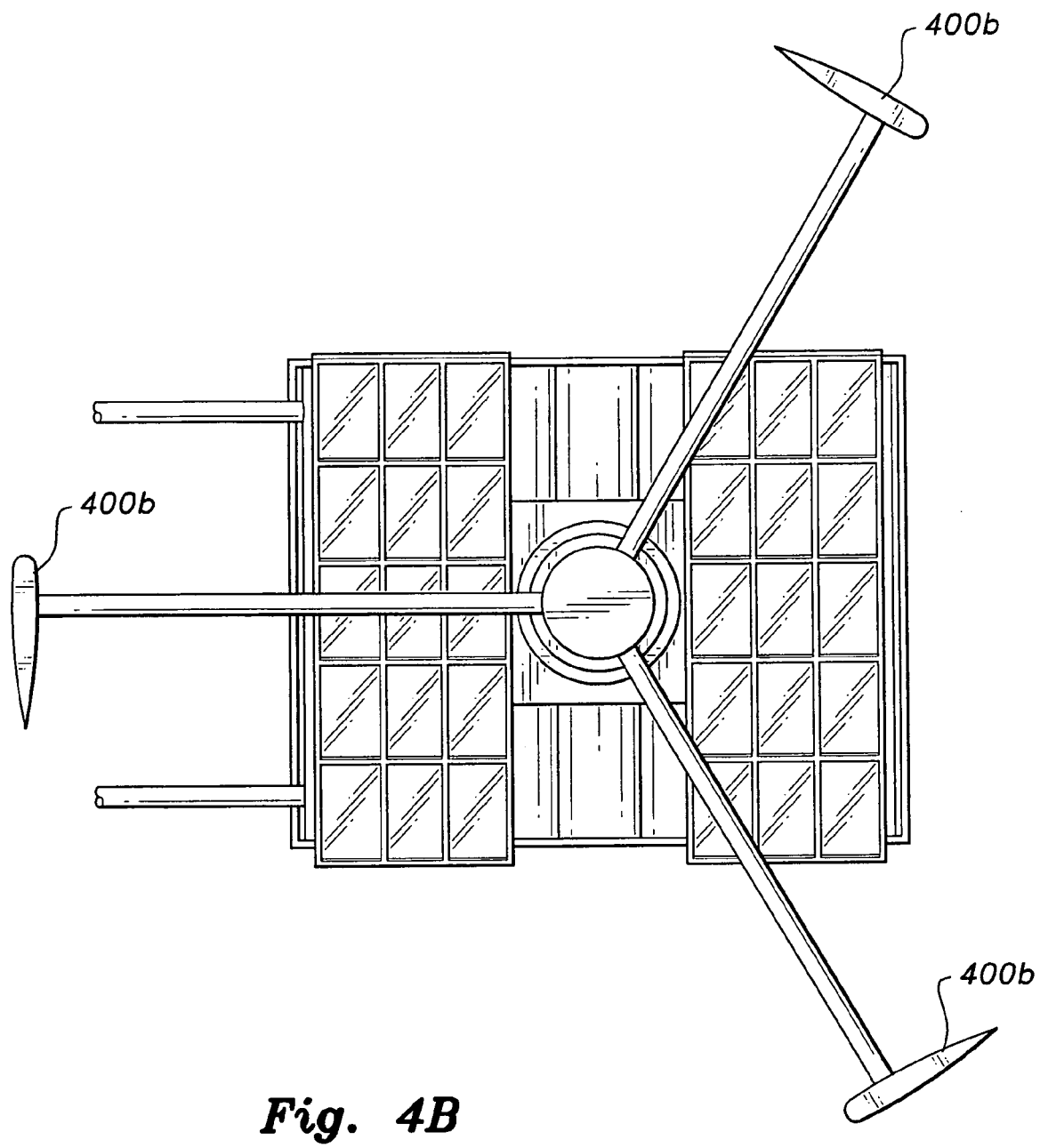
FIG. 4B is a top view of the VAWT of a portable and autonomous desalination system according to the present invention, showing the turbine configured as a lift device.

As shown in FIG. 4A, blades 400a are crescent-shaped, or more particularly, have a concave blade face at the ends of elongated rotor arms extending radially from a hub that provides aerodynamic drag in the face of wind normal to the blades 400a in order to facilitate operation of the VAWT as a drag device. Conversely, as shown in FIG. 4B, blades 400b are teardrop-shaped airfoils disposed normal to the elongated rotor arms in order to facilitate operation of the VAWT as a lift device due to differences in air pressure from the flow of wind over the opposite faces of the blades 400b.

It is to be understood that the present invention is not limited to the embodiment described above, but encompasses any and all embodiments within the scope of the following claims.

We claim:

1. A desalination system, comprising:
   a portable mounting base having a top and a bottom;
   a plurality of wheels attached to the bottom of the portable mounting base;
   a reverse-osmosis (RO) desalination unit disposed on the portable mounting base;
   an electricity generator disposed on the top of the portable mounting base, the electricity generator being electrically connected to the RO desalination unit for providing electrical power;
   a telescopic hub coaxially disposed proximate the electricity generator and extending substantially vertically;
   a vertical-axis wind turbine (VAWT) unit coaxially disposed on the telescopic hub, the VAWT having a rotor assembly and a plurality of vertically disposed blades, the vertical-axis wind turbine rotating the electricity generator, said vertical-axis wind turbine unit further including a plurality of telescopic arms, the telescopic arms extending and retracting the plurality of vertically disposed blades to effect the performance of the VAWT in a variety of wind conditions, the plurality of telescopic arms extending radially from the telescopic hub;
   a photovoltaic (PV) unit mounted on a housing of the electricity generator, the PV unit providing electrical power to the RO desalination unit; and
   an electrical storage unit disposed in the desalination system, the electrical storage unit providing electrical power to the RO desalination unit.

2. The desalination system according to claim 1, wherein the rotor assembly of the VAWT comprises a plurality of compact size straight blades operating at very low cut-in speeds.

3. The desalination system according to claim 1, wherein said plurality of telescopic arms extend substantially horizontally.

4. The desalination system according to claim 1, wherein a convergent channel is used and oriented upstream of the VAWT according to prevalent wind directions, the convergent channel enhancing performance of the VAWT.

5. The desalination system according to claim 1, wherein said blades comprise a plurality of arcuate blades.

6. The desalination system according to claim 1, wherein the reverse osmosis unit comprises:
   a plurality of water tubes disposed on the wheeled base;
   a plurality of planar vertical support members disposed on the wheeled base, the planar vertical support members stabilizing a configuration of the water tubes on the wheeled base;
   a gravity feed inlet connected to the water tubes, the gravity feed inlet guiding salt water into the tubes; and
   a water outlet connected to the water tubes, the water outlet guiding desalinated water out of the water tubes.

7. The desalination system according to claim 1, wherein said vertically disposed blades are disposed on the ends of the corresponding ones of the plurality of telescopic arms, said blades each having a concave face presenting drag to wind for operation as a drag device.

8. The desalination system according to claim 1, wherein said vertically disposed blades are disposed on the ends of the corresponding ones of the plurality of telescopic arms, said blades each having a substantially teardrop shape disposed normal to the rotor arms in order to present an airfoil shape to wind for operation as a lift device.

* * * * *